(12) United States Patent
Attarde et al.

(10) Patent No.: US 8,732,133 B2
(45) Date of Patent: May 20, 2014

(54) EXTENSIBLE DATA DEDUPLICATION SYSTEM AND METHOD

(75) Inventors: Deepak Attarde, Marlboro, NJ (US); Manoj Kumar Vijayan, Marlboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 390 days.

(21) Appl. No.: 12/725,288

(22) Filed: Mar. 16, 2010

(65) Prior Publication Data

US 2011/0231362 A1  Sep. 22, 2011

(51) Int. Cl.
*G06F 17/30* (2006.01)

(52) U.S. Cl.
USPC .......................................... 707/664; 707/692

(58) Field of Classification Search
USPC .................... 707/661, 664, 667, 692
See application file for complete search history.

(56) References Cited

U.S. PATENT DOCUMENTS

| 6,026,425 | A  | * | 2/2000 | Suguri et al. ................. 718/105 |
| 6,735,601 | B1 | * | 5/2004 | Subrahmanyam ......... 707/999.2 |
| 7,502,905 | B2 | * | 3/2009 | Sonobe ........................ 711/170 |
| 7,908,436 | B1 | * | 3/2011 | Srinivasan et al. ............ 711/114 |
| 2008/0222434 | A1 | * | 9/2008 | Shimizu et al. ................ 713/300 |
| 2008/0243769 | A1 | * | 10/2008 | Arbour et al. ..................... 707/2 |
| 2008/0288746 | A1 | * | 11/2008 | Inglett et al. ..................... 712/20 |
| 2010/0064166 | A1 | * | 3/2010 | Dubnicki et al. ................. 714/4 |

* cited by examiner

*Primary Examiner* — Vincent F Boccio
(74) *Attorney, Agent, or Firm* — Sheppard Mullin Richter & Hampton LLP

(57) ABSTRACT

A system and method for data deduplication is presented. A deduplication system includes a plurality of data deduplication nodes; and a data deduplication control node communicatively coupled to the plurality of data deduplication nodes. The deduplication control node performs the operations of performing data deduplication operations at a deduplication system having one or more deduplication nodes at which deduplication data blocks are stored; monitoring a performance characteristic of the deduplication system; and adding an additional deduplication node to the deduplication system when the performance characteristic indicates performance of the system below a predetermined minimum.

36 Claims, 8 Drawing Sheets

EXTENSIBLE DATA DEDUPLICATION SYSTEM AND METHOD

TECHNICAL FIELD

The present invention generally relates to data deduplication, and more particularly, some embodiments relate to systems and methods for extensible data deduplication.

DESCRIPTION OF THE RELATED ART

The storage and retrieval of data is an age-old art that has evolved as methods for processing and using data have evolved. In the early 18$^{th}$ century, Basile Bouchon is purported to have used a perforated paper loop to store patterns used for printing cloth. In the mechanical arts, similar technology in the form of punch cards and punch tape were also used in the 18$^{th}$ century in textile mills to control mechanized looms. Two centuries later, early computers also used punch cards and paper punch tape to store data and to input programs.

However, punch cards were not the only storage mechanism available in the mid 20$^{th}$ century. Drum memory was widely used in the 1950s and 1960s with capacities approaching about 10 kb, and the first hard drive was developed in the 1950s and is reported to have used 50 24-inch discs to achieve a total capacity of almost 5 MB. However, these were large and costly systems and although punch cards were inconvenient, their lower cost contributed to their longevity as a viable alternative.

In 1980 the hard drive broke the 1 GB capacity mark with the introduction of the IBM 3380, which could store more than two gigabytes of data. The IBM 3380, however, was about as large as a refrigerator, weighed ¼ ton, and cost in the range of approximately $97,000 to $142,000, depending on the features selected. This is in stark contrast to contemporary storage systems that provide for storage of hundreds of terabytes of data or more for seemingly instantaneous access by networked devices. Even handheld electronic devices such as digital cameras, MP3 players and others are capable of storing gigabytes of data, and today's desktop computers boast hundreds of gigabytes of storage capacity.

However, with the advent of networked computing, storage of electronic data has migrated from the individual computer to network-accessible storage devices. These include, for example, optical libraries, Redundant Arrays of Inexpensive Disks (RAID), CD-ROM jukeboxes, drive pools and other mass storage technologies. These storage devices are accessible to and can be shared by individual computers such as via a Local Area Network (LAN), a Wide Area Network (WAN), or a Storage Area Network (SAN) to name a few. These client computers not only access their own local storage devices but also storage devices of the network to perform backups, transaction processing, file sharing, and other storage-related operations.

The large volumes of data often stored and shared by networked devices can cause overloading of the limited network bandwidth. For example, during operations such as system backups, transaction processing, file copying and transfer, and other similar operations, the communication bandwidth of the network often becomes the rate-determining factor.

In addition, even with large capacity storage systems, computing enterprises are being overloaded by vast amounts of data. Documents sent via email, for example, can be copied and resent multiple times and several instances of the very same document might be stored many times in many different locations. IT administrators are struggling to keep up with the seemingly exponential increase in the volume of documents, media and other data. This problem is severely compounded by other factors such as the large file sizes often associated with multi-media files, and file proliferation through email and other content sharing mechanisms. However, additional storage capacity requires capital expenditures, consumes power, takes up floor space and burdens administrative overhead. Even with additional storage capacity, the sheer volume of data becomes a strain on backup and data recovery plans, leading to greater risk in data integrity.

As an alternative to simply increasing the amount of storage capacity, contemporary enterprises have turned to compression and other like technologies to reduce the volume of data. One such technology that can be used is known as data deduplication. Data deduplication in its various forms eliminates or reduces the amount of redundant data by implementing policies that strive to reduce the quantity of, or even eliminate instances of, redundant data blocks in storage. With data deduplication, data is broken up into segments or blocks. As new data enters the system, the segments are checked to see if they already exist in storage. If a segment already exists, rather than store that segment again, a pointer to the location of the existing segment is stored.

The segment size selected for data deduplication can be defined at various levels, from small segment sizes (for example, 1 kB or less) to much larger segment sizes, and to entire files. A larger segment size can yield greater space or bandwidth savings on a per-instance basis, however, the opportunities for identifying redundancies is statistically expected to be reduced with larger segment sizes. These tradeoffs can depend on the system with which deduplication is implemented and the types of data or files it handles.

As indicated above, in some instances, deduplication can be performed on a file-by-file basis. With such a system, rather than storing multiple copies of the same file, one instance of the file is stored, for example, in a central repository, and pointers to the file are stored in place of the redundant copies. However, deduplication at the file level can suffer in efficiencies as compared to deduplication using smaller segment sizes because even a small change in the file generally requires that an entire copy of the file be re-stored.

In addition to reducing the amount of storage space consumed, data deduplication can also help to relieve congestion on crowded communication pathways. In addition, the more efficient use of disk space can often allow data retention periods to increase, adding more integrity to the enterprise. Data deduplication is frequently used in conjunction with other forms of data reduction, including conventional data compression algorithms and delta difference storage.

Data deduplication often relies on hashing algorithms that hash the data segments to generate an identifying signature for the segments. Accordingly, each segment is processed using the hashing algorithm to generate a hash value. The resultant hash value is compared against hash values stored in a hash table to determine whether the segment already exists. If so, the segment is replaced with a pointer to the entry in the table containing the appropriate hash value or pointing to the location of the data in storage. Otherwise, the the new data is stored and its hash value is added to the table along with an address for the data.

Because hash functions are not perfect, the same hash value can in some cases be returned for segments containing different data. When such a false-positive occurs, the system can mistake new data for already-stored data and fail to store the new segment. Accordingly, multiple hash algorithms and other techniques can be employed to reduce the likelihood of these so-called hash collisions.

Conventional deduplication systems have scaling limitations. As the volume of data increases the quantity of hashes or other pointers also tends to increase. This means that the data capacity requirements of conventional systems are stretched as are the requirements for searching hashes when performing deduplication and pruning operations. Accordingly, the scalability of conventional deduplication systems is limited by the physical characteristics of the database. These limitations stem not only from the capacity of the database, but also from the performance hit that is suffered by increased database size.

BRIEF SUMMARY OF EMBODIMENTS OF THE INVENTION

According to various embodiments, systems and methods are provided for data deduplication. Particularly, in some embodiments, a computer-implemented method for performing data deduplication for data, includes a deduplication control node performing data deduplication operations at a deduplication system having one or more deduplication nodes at which deduplication data blocks are stored; the deduplication control node monitoring a performance characteristic of the deduplication system; and the deduplication control node adding an additional deduplication node to the deduplication system when the performance characteristic indicates performance of the system below a predetermined minimum. In one embodiment, the computer-implemented method further includes the step of migrating one or more data blocks from the one or more deduplication nodes of the deduplication system to the additional deduplication node added to the deduplication system.

In another embodiment, the method includes the operation of rebalancing data stored in the data deduplication system across the one or more deduplication nodes and the additional deduplication node. In a further embodiment, data blocks stored in the one or more nodes are represented by hash values stored in a deduplication database and the operation of rebalancing includes performing a modulo arithmetic operation on the hash values of the data blocks stored in the one or more nodes; determining a remainder from the modulo arithmetic operation; and relocating some or all of the data blocks among at least one of the one or more deduplication nodes and the additional deduplication node using the remainder from the modulo arithmetic operation for a hash of a given data block to determine in which node to store the given data block. For example, the modulo arithmetic operation can include a modulo N operation, where N is the quantity of the one or more deduplication nodes and the additional deduplication node.

The performance characteristic used in the method can include one or more of the following: consumed capacities of nodes in the deduplication database; available capacities of nodes in the deduplication database; throughput of nodes in the deduplication database; frequency of hits to nodes in the deduplication database; performance of nodes in the deduplication database; network traffic at nodes in the deduplication database; and speed of nodes in the deduplication database.

In another embodiment, data blocks stored in the one or more nodes are represented by hash values stored in a deduplication database and the rebalancing includes defining a plurality of ranges of the hash values; assigning each of the one or more deduplication nodes and the additional deduplication node to one of the plurality of ranges of hash values; and relocating some or all of the data blocks to a deduplication node to which their respective hash values are assigned. Further, the method can include the network control node determining a hash value for a received data block; determining which one of the plurality of ranges the hash value determined for the received block belongs to; and storing the received data block in a data deduplication note to which the determined range is assigned.

In yet another embodiment, data blocks stored in the one or more nodes are represented by hash values stored in a deduplication data base, and the method also includes calculating hash identifiers for the hash values, wherein a hash identifier uniquely identifies a group of one or more hash values; and associating a hash identifier with hash values in the group of hash values identified by the hash identifier. As one example, the hash identifier can be a CRC checksum computed for one or more hash values. The method can further include receiving a data block for deduplication; calculating a hash value for the data block received; calculating a hash identifier for the hash value calculated for the received data block; comparing the calculated hash identifier with existing hash identifiers to identify a matching hash identifier associated with one or more hash values; and comparing the hash value with the one or more hash values associated with the identified matching hash identifier to determine whether the hash value calculated for the data block received matches a hash value already stored for a data block in the database.

In various embodiments, the operations described herein can be performed by computer program code enabling a computing device to perform the operations. The computer program code can be embodied on a computer program product comprising a computer-readable medium. In other embodiments, a deduplication system includes a plurality of data deduplication nodes and a data deduplication control node communicatively coupled to the plurality of data deduplication nodes. The data deduplication control node can include a processor and memory communicatively coupled to the processor, the memory storing instructions to cause the processor to perform the operations of: performing data deduplication operations at a deduplication system having one or more deduplication nodes at which deduplication data blocks are stored; monitoring a performance characteristic of the deduplication system; and adding an additional deduplication node to the deduplication system when the performance characteristic indicates performance of the system below a predetermined minimum. The deduplication control node can be a stand-alone node or its functions can be assigned to and performed by one of the plurality of deduplication nodes. In another embodiment, its functions can be distributed across a plurality of deduplication nodes.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following Figure. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The Figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF EMBODIMENTS OF THE INVENTION

The present invention is directed toward a system and method for data deduplication, and more particularly various embodiments are directed toward systems and methods for augmenting deduplication storage capacity and tracking the storage of data items in the augmented storage system.

Figure 1:
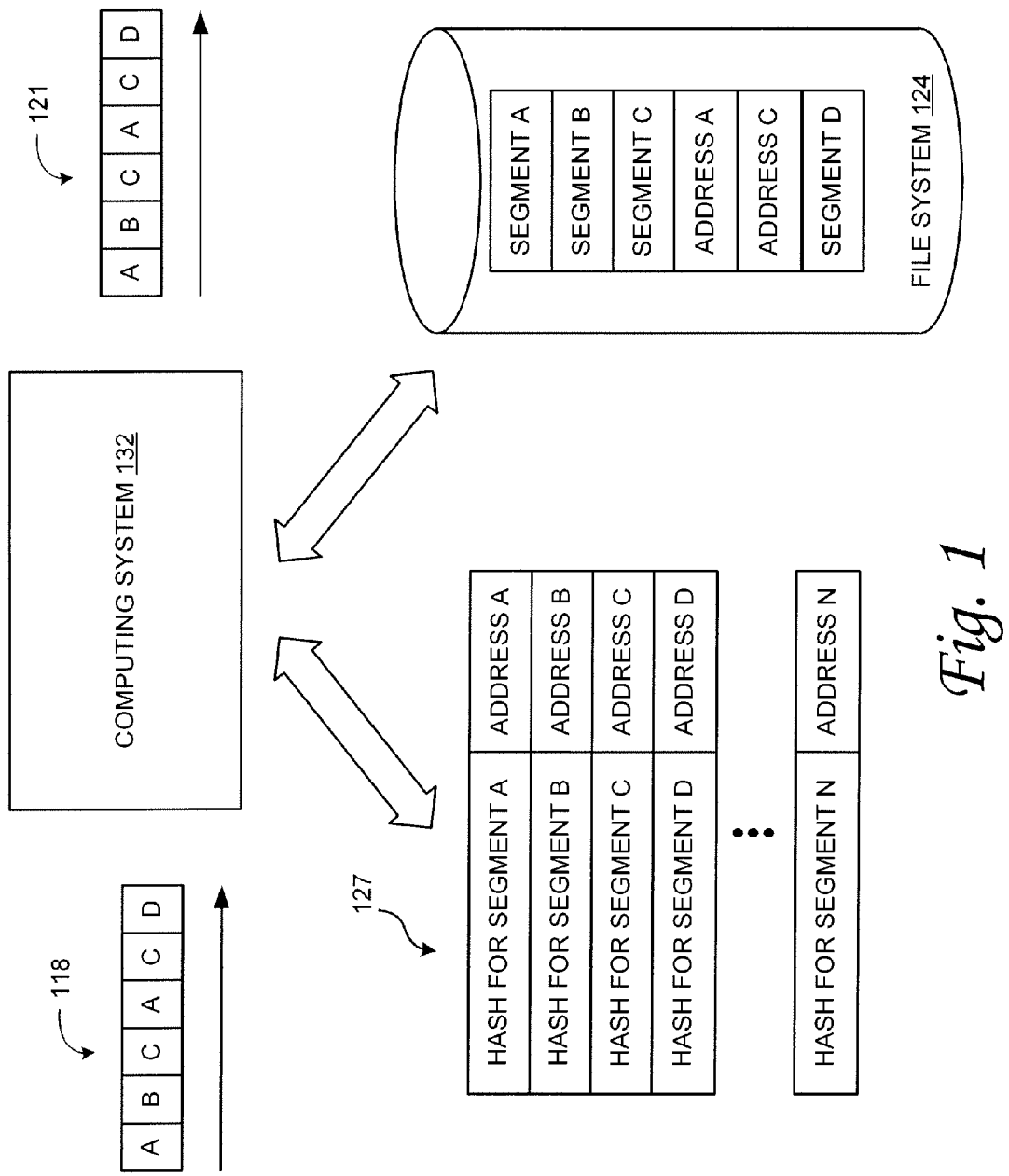
FIG. 1 is a diagram illustrating an example process for data deduplication with which the systems and methods described herein can be used.

Before describing the invention in detail, it is useful to describe a few example environments with which the invention can be implemented. One such example is that of a straightforward data deduplication algorithm with which the systems and methods described herein can be implemented. FIG. 1 is a diagram illustrating an example process for data deduplication in accordance with various embodiments. It will be appreciated after reading the description provided herein that the various embodiments of the invention not limited to applicability with this example data deduplication process, but can be implemented with any of a variety of forms is of data deduplication.

Referring now to FIG. 1, the illustrated example assumes an incoming data stream 118. For purposes of deduplication, the data stream can be segmented into a plurality of preferably equal-length segments. For example, in some embodiments, the data is broken up into segments that are 128 kB in length. In the illustrated example, incoming data stream 118 includes the segments A, B, C, A, C and D in that order. To perform the data deduplication, the computing system 132 receives the data, segments the data, and runs a hash function or other signature generation algorithm against each segment. The computing system 132 checks the resultant hash value for a given segment with hash values stored in hash table 127. If the resultant hash value does not match a hash value already stored, this indicates that the segment is a new segment of data. In this case, this new segment of data is written into file system 124, its hash value is added to hash table 127 as is a pointer to its address in the file system 124.

On the other hand, if the resultant hash value for a given segment already exists in the hash table 127, this indicates that the same data sequence in that segment is already stored in file system 124. Accordingly, rather than storing the entire segment in the file, only the pointer or address to the same segment that was previously stored needs to be retained. Following this methodology for data stream 118 results in the example file 129 illustrated as being stored in file system 124. This example file includes the first instances of segments A, B, C and D. However, for the subsequent instances of segments A and C that occurred in the incoming data stream 118, the file includes a pointer to the originally stored segments A and C. This is illustrated by ADDRESS A and ADDRESS C in file system 124.

To re-create the original data stream, segments are retrieved from file system 124 and assembled in order. Where an address exists in place of the actual data elements of the segment (ADDRESS A and ADDRESS C in the instant example), that address is accessed, the data retrieved and packaged into the reassembled data stream. In this example, resultant data stream 121 contains the same data as existed in original data stream 118.

Although the illustrated example depicts a system that utilizes a simple reference table having a hash value and pointer value for each segment, more complex systems can also make up an environment for the systems and methods described herein. Fore example, for the hash values the reference table can also include the source or sources of the data segment represented by the hash, a counter of the number of times that a given segment is encountered, the location of where the segments occur on client devices, and so on. As such, the reference table can be implemented as a hybrid of a hash table and a file allocation table (FAT). This can be useful as a backup in the event that a client system crashes or otherwise goes off line.

The above example is described in terms of an individual computing system (having one or more computing devices) performing local data deduplication for local data storage using a hash function. Data deduplication can also be performed for a plurality of computing systems using shared or local data storage or a combination thereof For example, the data segments need not be stored at a central location such as file system 124 but can be stored at one or more client locations or at a combination of client locations and central storage locations. Accordingly, the pointers or addresses stored in the reference table can point to the actual storage location of the referenced segment whether that location be at a client storage location or in a central storage repository.

In addition, techniques other than hash functions can be used for data deduplication. Other algorithms can be used to generate a signature for the blocks of data. Likewise, other deduplication methods can also be used to identify redundancies or duplicate entries. Accordingly, the terms hash table, signature table, or reference table might be used in this document interchangeably to refer to the table, index, or other like mechanism used to track the data deduplication process, regardless of the actual file structure and regardless of the function used to arrive at the signatures.

The systems and methods described herein can be implemented using a number of different deduplication architectures. One such exemplary deduplication architecture is described with reference to FIG. 2. The example storage operation cell 50 shown in FIG. 2 may perform storage operations on electronic data such as that in a computer network. As shown in this example, storage operation cell 50 may generally include a storage manager 100, a data agent 95, a media agent 105, a storage device 115. The storage operation cell 50 may also include components such as a client 85, a data or information store 90, databases 110 and 111, jobs agent 120, an interface module 125, a management agent 130. Each media agent 105 may control one or Input/Output devices such as Host Bus Adaptor (HBA) or other communications link for transferring data from client 85 to storage devices 115 (depicted generally in FIG. 2 as HBA devices 133). Such a system and elements thereof are exemplary of a modular backup system such as the CommVault QiNetix system, and also the CommVault GALAXY backup system, available from CommVault Systems, Inc. of Oceanport, N.J., and further described in U.S. Pat. Nos. 7,035,880 and 7,620,710 each of which is incorporated herein by reference in its entirety.

A storage operation cell, such as cell 50, may generally include combinations of hardware and software components associated with performing storage operations on electronic data. Exemplary storage operation cells according to embodiments of the invention may include, as further described herein, CommCells as embodied in the QNet storage management system and the QiNetix storage management system by CommVault Systems of Oceanport, N.J. According to some embodiments of the invention, storage operation cell 50 may be related to backup cells and provide some or all of the functionality of backup cells as described in U.S. Pat. No. 7,395,282, which is also incorporated by reference herein. However, in certain embodiments, storage operation cells may also perform additional types of storage operations and other types of storage management functions that are not generally offered by backup cells.

In accordance with certain embodiments additional storage operations performed by storage operation cells may include creating, storing, retrieving, and migrating primary data copies and secondary data copies (which may include, for example, snapshot copies, backup copies, Hierarchical Storage Management (HSM) copies, archive copies, and other types of copies of electronic data). In some embodiments, storage operation cells may also provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In some embodiments, storage operations may be performed according to a storage policy. A storage policy is generally a data structure or other information source that includes a set of preferences and other storage criteria for performing a storage operation. The preferences and storage criteria may include, but are not limited to, a storage location, relationships between system components, network pathway to utilize, retention policies, data characteristics, compression or encryption requirements, preferred system components to utilize in a storage operation, and other criteria relating to a storage operation. Thus, a storage policy may indicate that certain data is to be stored in a specific storage device, retained for a specified period of time before being aged to another tier of secondary storage, copied to secondary storage using a specified number of streams, etc. A storage policy may be stored to a storage manager database 111, to archive media as metadata for use in restore operations or other storage operations, or to other locations or components of the system.

A schedule policy can be used to specify when to perform storage operations and how often and may also specify performing certain storage operations on sub-clients of data and how to treat those sub-clients. A sub-client may represent static or dynamic associations of portions of data of a volume and are typically mutually exclusive. Thus, a portion of data may be given a label and the association is stored as a static entity in an index, database or other storage location used by the system. Sub-clients may also be used as an effective administrative scheme of organizing data according to data type, department within the enterprise, storage preferences, etc. For example, an administrator may find it preferable to separate e-mail data from financial data using two different sub-clients having different storage preferences, retention criteria, etc. Storage operation cells may contain not only physical devices, but also may represent logical concepts, organizations, and hierarchies. For example, a first storage operation cell 50 may be configured to perform HSM operations, such as data backup or other types of data migration, and may include a variety of physical components including a storage manager 100 (or management agent 130), a media agent 105, a client component 85, and other components as described herein. A second storage operation cell 50 may contain the same or similar physical components, however, it may be configured to perform Storage Resource Management (SRM) operations, such as monitoring a primary data copy or performing other known SRM operations.

Thus, as can be seen from the above, although the first and second storage operation cells are logically distinct entities configured to perform different management functions (e.g., HSM and SRM respectively), each cell may contain the same or similar physical devices in both storage operation cells. Alternatively, in other embodiments, different storage operation cells may contain some of the same physical devices and not others. For example, a storage operation cell 50 configured to perform SRM tasks may contain a media agent 105, client 85, or other network device connected to a primary storage volume, while a storage operation cell 50 configured to perform HSM tasks may instead include a media agent 105, client 85, or other network device connected to a secondary storage volume and not contain the elements or components associated with and including the primary storage volume. These two cells, however, may each include a different storage manager 100 that coordinates storage operations via the same media agents 105 and storage devices 115. This "overlapping" configuration allows storage resources to be accessed by more than one storage manager 100 such that multiple paths exist to each storage device 115 facilitating failover, load balancing and promoting robust data access via alternative routes.

Alternatively, in some embodiments, the same storage manager 100 may control two or more cells 50 (whether or not each storage cell 50 has its own dedicated storage manager 100). Moreover, in certain embodiments, the extent or type of overlap may be user-defined (through a control console (not shown)) or may be automatically configured to optimize data storage and/or retrieval.

Data agent 95 may be a software module or part of a software module that is generally responsible for archiving, migrating, and recovering data from client computer 85 stored in an information store 90 or other memory location. Each client computer 85 may have at least one data agent 95 and the system can support multiple client computers 85. In some embodiments, data agents 95 may be distributed between client 85 and storage manager 100 (and any other intermediate components (not shown)) or may be deployed from a remote location or its functions approximated by a remote process that performs some or all of the functions of data agent 95.

Generally speaking, storage manager 100 may be a module that coordinates and controls storage operations performed by storage operation cell 50. Storage manager 100 may communicate with some or all elements of storage operation cell 50 including client computers 85, data agents 95, media agents 105, and storage devices 115, to initiate and manage system backups, migrations, and data recovery.

Storage manager 100 may include a jobs agent 120 that monitors the status of some or all storage operations previously performed, currently being performed, or scheduled to be performed by storage operation cell 50. Jobs agent 120 may be communicatively coupled with an interface module 125. Interface module 125 may include information processing and display software, such as a graphical user interface "GUI," an application program interface "API," or other interactive interface through which users and system processes can retrieve information about the status of storage operations. Through interface module 125, users may issue instructions to various storage operation cells 50 regarding performance of the storage operations as described. For example, a user may employ the GUI to view the status of pending storage operations in some or all of the storage operation cells in a given network or to monitor the status of certain components in a particular storage operation cell (e.g., the amount of storage capacity left in a particular storage device).

Storage manager module 100 may also include a management agent 130 that is typically implemented as a software module or application program. In general, management agent 130 provides an interface that allows various management components 100 in other storage operation cells 50 to communicate with one another. For example, assume a certain network configuration includes multiple cells 50 adjacent to one another or otherwise logically related in a WAN or LAN configuration (not shown). With this arrangement, each cell 50 may be connected to the other through each respective interface module 125. This allows each cell 50 to send and receive certain pertinent information from other cells 50 including status information, routing information, information regarding capacity and utilization, etc. These communication paths may also be used to convey information and instructions regarding storage operations.

For example, a management agent 130 in first storage operation cell 50 may communicate with a management agent 130 in a second storage operation cell 50 regarding the status of storage operations in the second storage operation cell. Another illustrative example includes the case where a management agent 130 in first storage operation cell 50 communicates with a management agent 130 in a second storage operation cell to control the storage manager 100 (and other components) of the second storage operation cell via the management agent 130 contained in the storage manager 100.

Another illustrative example is the case where management agent 130 in the first storage operation cell 50 communicates directly with and controls the components in the second storage management cell 50 and bypasses the storage manager 100 in the second storage management cell. If desired, storage operation cells 50 can also be organized hierarchically such that hierarchically superior cells control or pass information to hierarchically subordinate cells or vice versa.

Storage manager 100 may also maintain an index cache, a database, or other data structure (not pictured) that can be stored in storage manager database 111 or elsewhere. This data structure may be used to indicate logical associations between components of the system, user preferences, management tasks, some SRM or HSM data or other useful data. As further described herein, some of this information may be stored in a media agent database 110 or other local data store according to some embodiments. For example, the storage manager 100 may use data from database 111 to track logical associations between media agents 105 and storage devices 115.

A media agent 105 may be implemented as a module that conveys data, as directed by storage manager 100, between a client computer 85 and one or more storage devices 115 such as a tape library, a magnetic media storage device, an optical media storage device, or any other suitable storage device. In one embodiment, media agents 105 may be communicatively coupled with and control a storage device 115 associated with that particular media agent. A media agent 105 may be considered to be associated with a particular storage device 115 if that media agent 105 is capable of routing and storing data to a particular storage device 115 via one or more communication links such as HBA links 133.

Each HBA link 133 may include multiple HBA communication paths that are associated with one or more media agents 105. HBA link 133 may also communicate data from clients 85 under the supervision of media agents 105 to storage devices 115 via HBA communication paths 116, whereby each HBA link 133 may provide multiple HBA communication paths 116 between each of media agents 105 and storage devices 115. In some embodiments, HBA link 133 may be part of or associated with a storage area network "SAN") and used by various resources with storage management cell 50 to transfer data to storage devices 115. Various exemplary embodiments associated with the connectivity and communication between media agents are described in the aforementioned U.S. Pat. No. 7,620,710.

Each media agent 105 may maintain an index cache, a database, or other data structure which stores index data generated during backup, migration, and restore and other storage operations as described herein. For example, performing storage operations on Microsoft Exchange data may generate index data. Such index data provides a media agent 105 or other external device with a fast and efficient mechanism for locating data stored or backed up. This data can be stored, for example, in database 110.

Thus, in some embodiments, a storage manager database 111 may store data associating a client computer 85 with one or more media agent(s) 105, HBA link 133, and storage device(s) 115, for example, as specified in a storage policy. Media agent database 110 may include information that indicate specifically where client data is stored in storage device 115, what specific files were stored, and other information associated with storage and retrieval of data from client computer 85. In some embodiments, such index data may be stored along with the data copied to a storage device 115, with an additional copy of the index data written to index cache 110. The data in index cache 110 is thus generally readily available for use in storage operations and other activities without having to be first retrieved from the storage device 115.

In some embodiments, certain components may reside and execute on the same computer. For example, certain components may execute on a client computer 85 such as a data agent 95, a media agent 105, or a storage manager 100 which may coordinate and direct local archiving, migration, and retrieval application functions as further described in U.S.

Pat. No. 7,035,880. This client computer 85 may function independently or together with other similar client computers 85.

Figure 2:
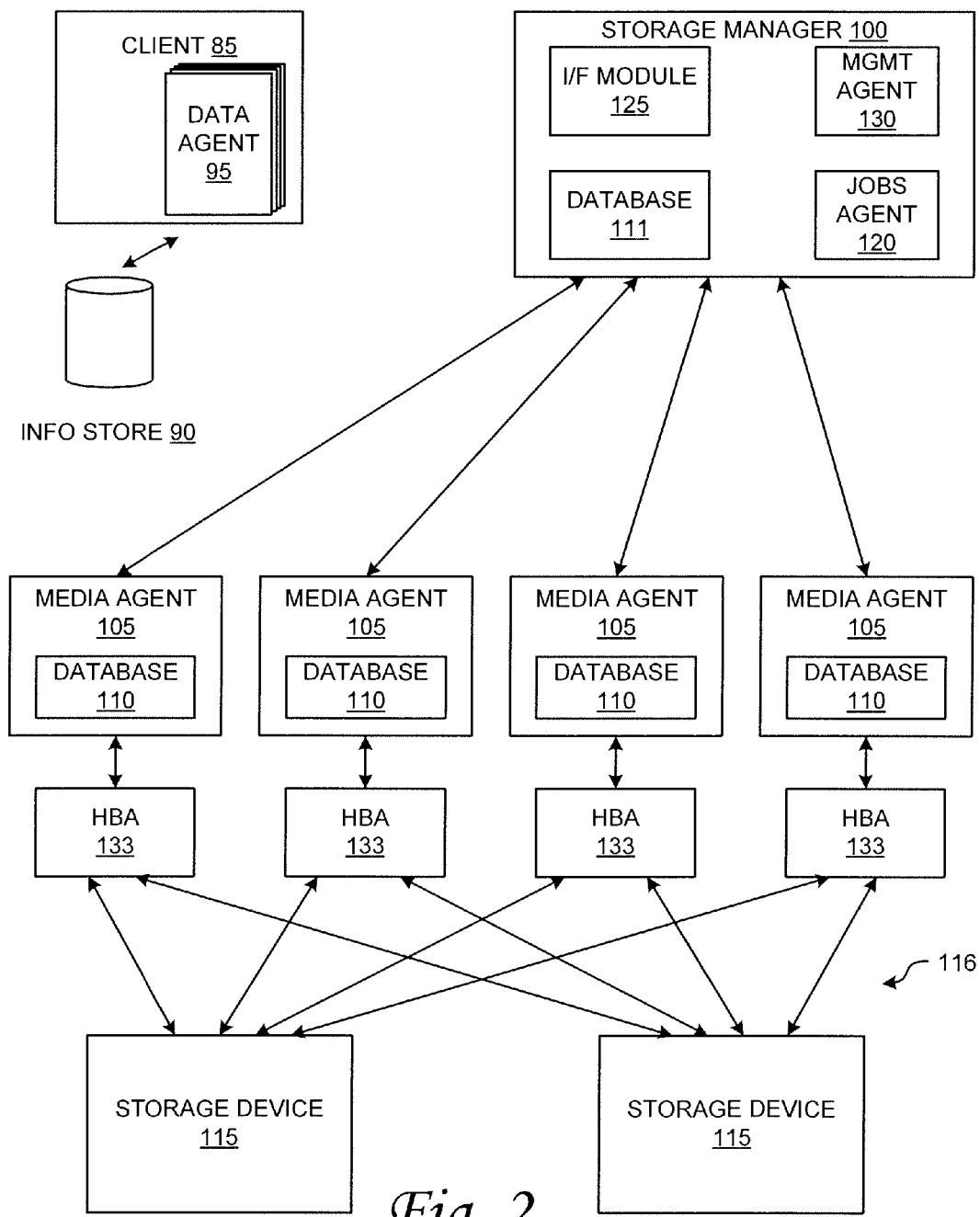
FIG. 2 is a diagram illustrating one exemplary deduplication architecture for performing storage operations on electronic data such as that in a computer network in accordance with one embodiment of the systems and methods described herein.

As stated, FIGS. 1 and 2 depict examples of data deduplication algorithms and architectures that can be used in conjunction with the systems and methods described herein. For ease of description and to provide contextual foundation, embodiments are described herein in terms of these examples. As would be apparent to one of ordinary skill in the art after reading this description, embodiments can be implemented using these and other deduplication algorithms and architectures.

With various deduplication architectures, physical limitations of the storage elements can become a limiting factor in the amount of data that can be stored from a practical perspective. In one embodiment, an extensible deduplication architecture is provided in which the number of data storage nodes can be augmented as performance criteria may dictate. For example, in terms of the example architecture described above with reference to FIG. 2, a deduplication architecture can be configured to extend storage by adding additional communication cells 50 to the deduplication database, by adding additional media agents 105 to the deduplication database, or by adding additional storage devices 115 to the deduplication database. Additionally systems and methods can be included to facilitate data deduplication storage, retrieval and pruning across an extended or extensible deduplication system.

Figure 3:
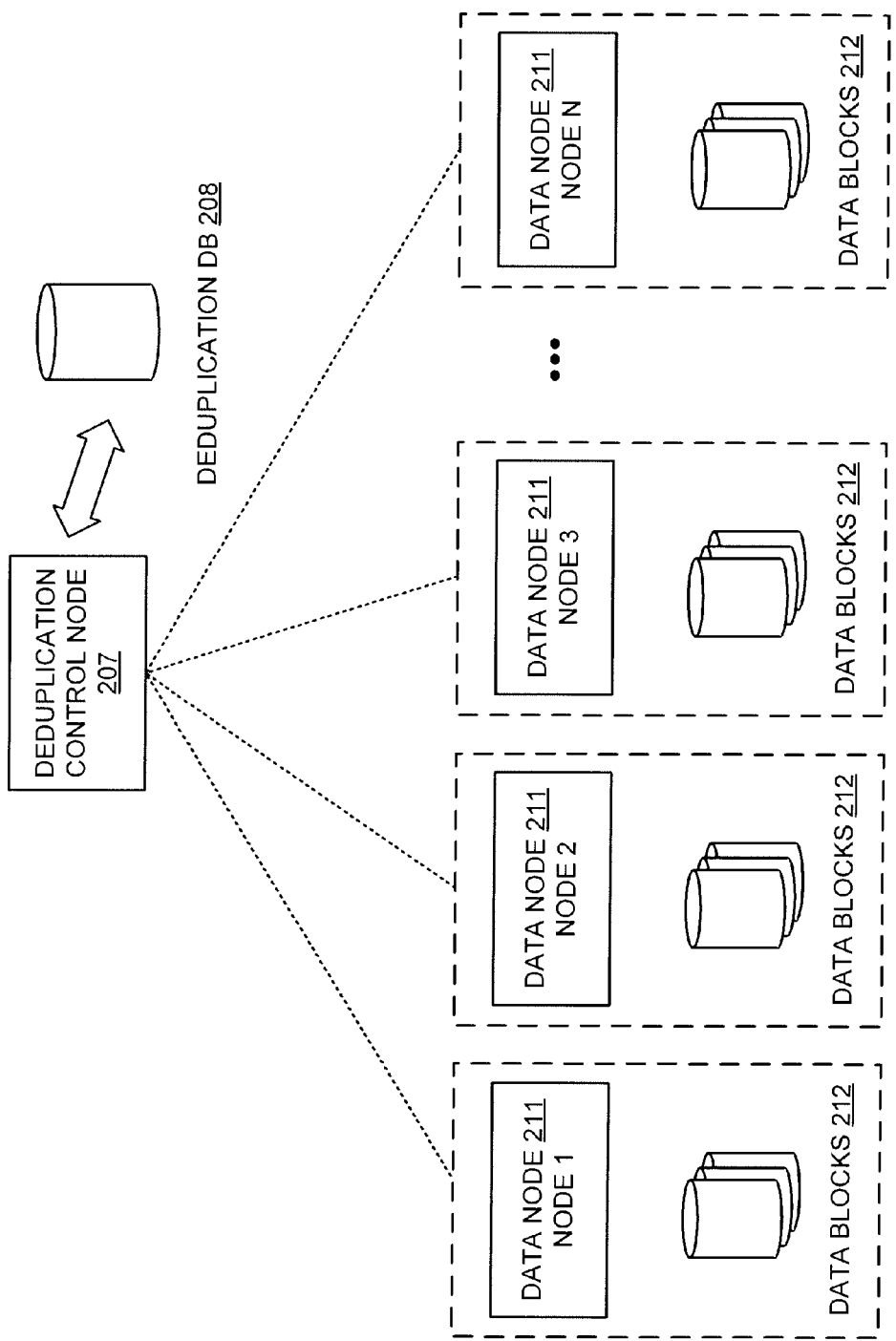
FIG. 3 is a diagram illustrating an example extensible deduplication architecture in accordance with one embodiment of the systems and methods described herein.

FIG. 3 is a diagram illustrating an example extensible deduplication architecture in accordance with one embodiment of the systems and methods described herein. Referring now to FIG. 3, the example includes a deduplication control node 207 along with an associated deduplication database 208, as well as a plurality of data nodes 211. In the example architecture illustrated in FIG. 3, and data nodes 211 are illustrated each configured for storing data blocks 212.

In one embodiment, deduplication control node 207 is a dedicated node or a node that is otherwise separate from data nodes 211. In another embodiment, the functionality assigned to deduplication control node 207 can be assigned to one or more of the data nodes 211 to perform the functions associated with the systems and methods described herein. Deduplication database 208 can be used to store deduplication information such as, for example, hash values for data blocks stored and the associated hash table; timestamp and reference count information to facilitate data block location and backups; and metadata, snapshots, and record logs to facilitate data recovery.

In accordance with various embodiments of the systems and methods described herein, deduplication control node 207 is configured to monitor the performance characteristics of the deduplication database or databases, and to bring online one or more additional data nodes 211 should the performance characteristics warrant the addition. For example, the control node 207 can monitor performance characteristics such as consumed and available capacities of existing nodes in the deduplication database, throughput of existing nodes, frequency of hits to existing nodes, performance of existing nodes, network traffic and speed associated with existing nodes, and so on. Thresholds or other metrics can be established such that if the performance characteristic or characteristics of a node or nodes in a database false below the threshold fails to meet the metrics, one or more additional nodes are brought online for deduplication operations.

Figure 4:
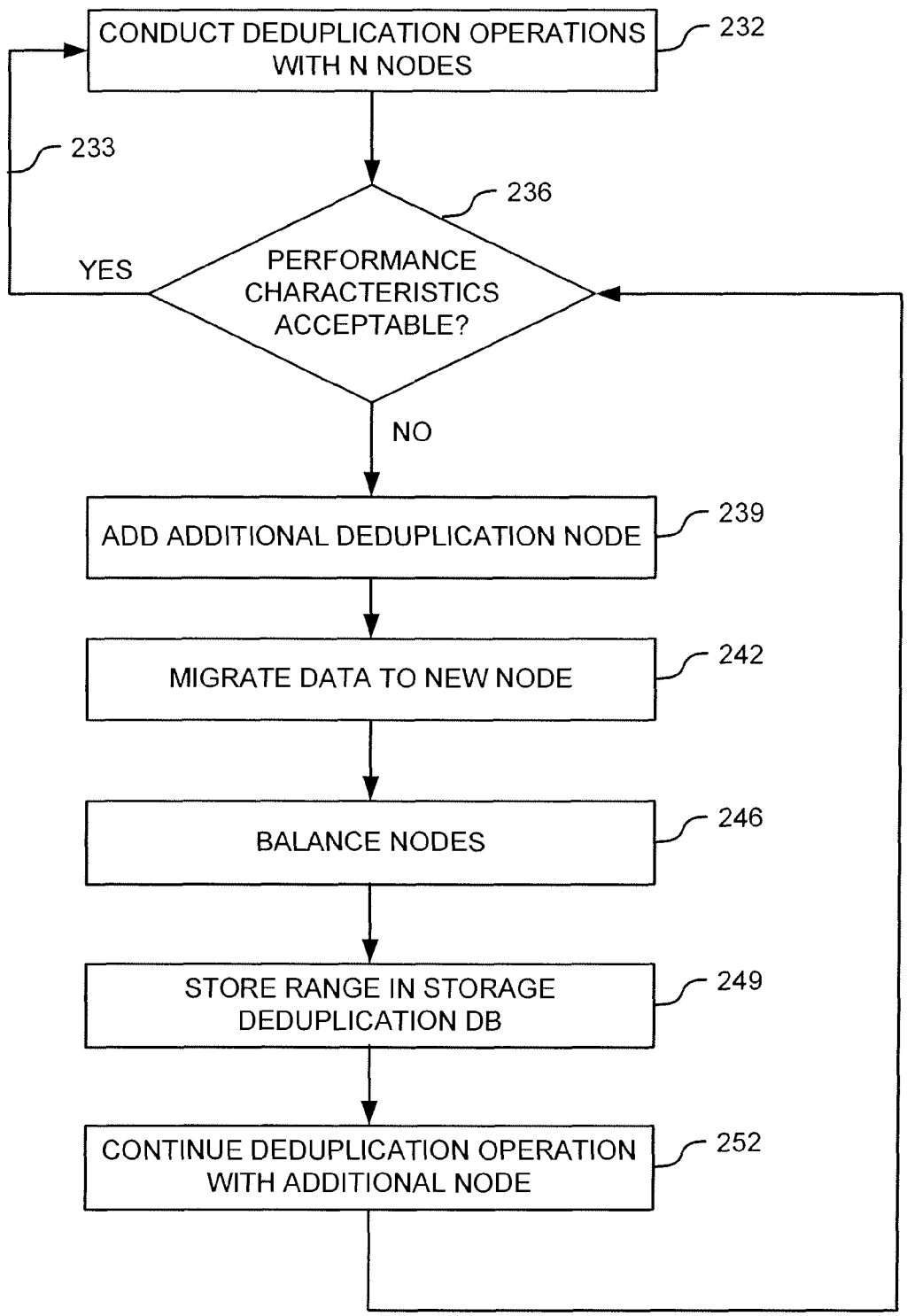
FIG. 4 is a diagram illustrating an example process for augmenting a deduplication database in accordance with one embodiment of the systems and methods described herein.

FIG. 4 is a diagram illustrating an example process for augmenting a deduplication database in accordance with one embodiment of the systems and methods described herein.

Referring now to FIG. 4, this example is now described in terms of the architecture illustrated in FIG. 3. At operation 232, the deduplication system performs deduplication operations with N nodes 211. As operations are being performed, deduplication control node 207 monitors the performance characteristics of the N nodes 211 in the system. As noted above, examples of performance characteristics can include consumed and available capacities of existing nodes 211 in the deduplication database, throughput of existing nodes 211, frequency of hits to existing nodes 211, performance of existing nodes 211, network traffic and speed associated with existing nodes 211, and so on. As performance characteristics may dictate, deduplication control node 207 determines if and when an additional deduplication node is brought online and added to the deduplication system. If at operation 236 it is determined that they system is operating within predetermined performance bounds the deduplication operation continues with the N nodes 211 as illustrated by flow line 233. For example, if the system is operating with sufficient available capacity, the frequency of hits on existing nodes is below an acceptable limit, the nodes are operating at or above a predetermined minimum speed, the performance characteristics are in bounds and an additional node or nodes are not needed.

If, on the other hand, performance issues rise to the level of needing attention at operation 236, then at operation 239 an additional deduplication node 211 is added to the system. In various embodiments, with the new node 211 online, data can be migrated to the new node at operation 242 and the nodes can be balanced at operation 246. For example, in these operations, some or all of the data in the previously existing N nodes 211 in the system, can be moved to the new node. In one embodiment, the node balancing can be performed as a matter of course when a new node 211 is brought online to balance the deduplication load across all the nodes 211 in the system. This can be done for example as a matter of course without a priori information about the various nodes and their loading. In another embodiment, the performance characteristics of each node can be analyzed to determine which node or nodes suffering a performance hit in data storage in that node or those nodes can be moved to the new node to balance the data based on performance.

This might be done, for instance, to address the performance characteristic issue or issues that existed prior to bringing the new node online. By way of further example, consider a scenario where a new node N+1 (not illustrated) was brought online because existing node 1 211 was experiencing an inordinate amount of hits, causing a degradation in system performance. Accordingly, in this example, data blobs such as, for example, data blocks 212 associated with the overloaded node 1 211 can be transferred to the new node N+1 to reduce the number of hits experienced by original node 1 211.

In yet a further embodiment, no migration or load-balancing is performed when a new node 211 is brought online. In such an embodiment, operations can continue with new data being stored in the new node alone, or the new data being stored across some or all of the nodes in the system.

In one embodiment, deduplication database 208 is configured to store information about the deduplication operations being managed by deduplication control node 207. For example, in one implementation deduplication database 208 stores arrange information for the hash values stored at data nodes 1-N 211. Accordingly, in such an embodiment, range information for the new node 211 can be stored in deduplication database 208. Additionally, in embodiments where load-balancing is performed, range information for the previously existing nodes 211 can also be updated or stored in deduplication database 208. In addition to range information, timestamp information can be included with the range data to facilitate determination of the age of the nodes (for example, so the system can determine which is a new node) as well as aging of hash values.

As illustrated by operation 252, with the new node now online the deduplication operation continues, and performance characteristics can continue to be monitored to determine whether and when any additional nodes should be added.

Figure 5:
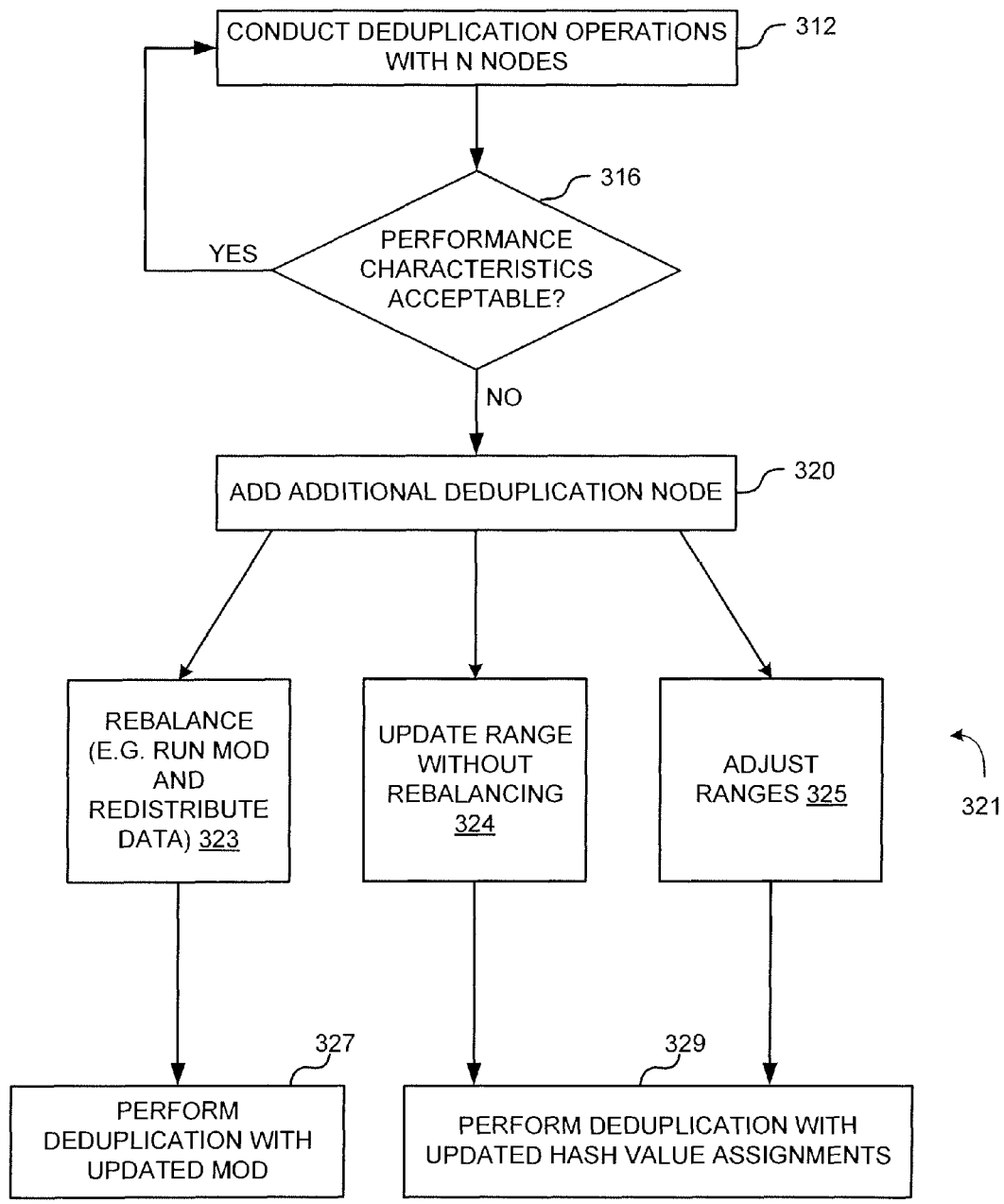
FIG. 5 is a diagram illustrating an example process for bringing a new node online with rebalancing options in accordance with one embodiment of the systems and methods described herein.

FIG. 5 is a diagram illustrating an example process for bringing a new node online with rebalancing options in accordance with one embodiment of the systems and methods described herein. From now to FIG. 5, at operation 312 the system conducts deduplication operations with N nodes 211. At operation 316, the system, for example a deduplication control node 207, determines whether one or more performance issues exist in the system. For example, the system determines whether a threshold beyond which a performance criteria should not pass has been exceeded, or whether the system is operating at acceptable levels of performance as measured by one or more performance metrics. If performance is acceptable, in one embodiment the operation continues without adding additional capacity. If a performance issue exists, the system adds an additional deduplication node as illustrated by operation 320. In one embodiment, operations 312, 316 and 320 are the same as or similar to operations 232, 236 and 239 as described above with reference to FIG. 4.

As illustrated at 321, any of a number of rebalancing operations can be applied after addition of the new deduplication node. Each of these example of rebalancing operations is now described. At operation 323, the system rebalances the deduplication node 211 by redistributing data blocks 212 stored in the nodes 211. For example, data blocks 212 stored in the original set of nodes 211 can be redistributed amongst all of the nodes 211 including the original set of nodes and the newly added node.

Operation 325 illustrates a further example in which the hash values for the data blocks 212 stored in nodes 211 can be broken into ranges of hash values and these ranges assigned to individual nodes 211. Where ranges are used, the ranges can be redefined or a new range added when a node is added. Where the ranges are redefined, the data that exists in a given node that now falls within the range assigned to the new node, can be moved from its previous node to the new node.

For example, in a four-node system, the first fourth of the hash values can be assigned to node 1, the second fourth to node 2, and so on. As another example, rather than being simply divided into quarters, performance characteristics of each node can be considered when assigning hash values to the range associated with a given node. Thus, nodes with greater processing power, higher throughput capabilities, greater storage capacities, and the like might be assigned a larger range of hash values. Additionally, the characteristics of the data blobs within a given hash range can be considered when defining ranges. For example, ranges can be selected such that range boundaries are defined so as to balance the hit rate of the data blobs within the various ranges. Preferably, when the ranges are adjusted to distribute part of the entire range to the new node, a rebalancing is performed. In this rebalancing, blocks 212 whose hash value is within a range assigned to a different node 211 are moved to that different node so that the ranges accurately reflect the hash values of blobs stored in the nodes.

The ranges can be tracked in a database such as, for example, deduplication control node database 208. With the ranges stored, when a hash is received for data retrieval or pruning operation, the system can look at the hash, and check the range table stored in database 208 to determine which node the data associated with that hash is stored.

As yet another example, operation 324 illustrates a scenario where the range is updated without rebalancing the nodes, and the new range values are used to make node assignment determinations for new data on a go forward basis. Accordingly, data blocks 212 originally stored in their respective nodes 211 remain in those nodes while new data blocks are assigned based on the updated mod operation. One way this is accomplished is to keep the original ranges intact for blocks stored in nodes 211 and add a new range for the new node. In such an environment, values within a range may not be contiguous, depending on past operations. With operations 324 and 325, after the new range values are assigned, deduplication operations can continue with the new assignments as illustrated at operation 329.

As still a further example, operation 323 illustrates an embodiment where balancing is performed based on a mod operation run on the hash values. In such an implementation, a mod N operation can be performed on hash values in a system having N number of nodes in the results of the moderation used to determine which blobs are assigned to which nodes 211. Examples of how mod operations can be performed for storage and retrieval are discussed in detail below with reference to FIG. 7.

At operation 327, deduplication operations continue using the updated mod algorithm to assign data blocks to nodes 211 in the system. The examples at operations 323, and 327 are described in terms of examples in which a mod N operation is used to assign hash values to nodes 211 in the system. After reading this description one of ordinary skill in the art will understand how to implement rebalancing and assignment with other systems using alternative mechanisms to assign hash values to nodes.

Another way to manage assignment of blobs or blocks 212 to nodes 211 is to store various hash values in nodes irrespective of hash operations or range determinations. A master hash table can be maintained (for example, at data base 208) to list which blobs are stored at which nodes. In such an application, if rebalancing is performed, the hash table can be updated to reflect the rebalancing. Regardless of whether rebalancing is performed, the hash table is updated to reflect new entries as deduplication operations continue with the new node.

Figure 6:
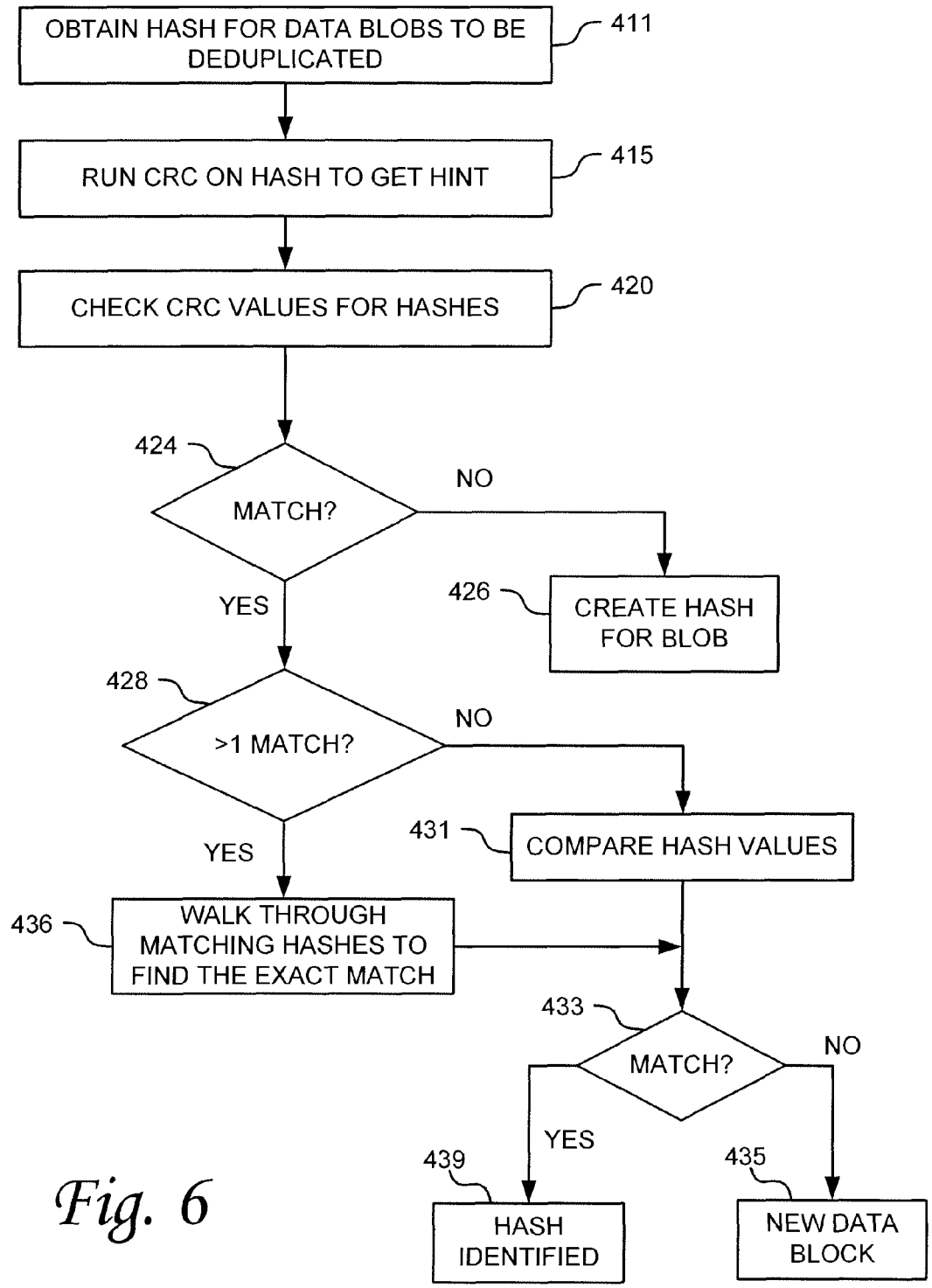
FIG. 6 is a diagram illustrating an example process for locating a hash value based on a hint in accordance with one embodiment of the systems and methods described herein.

Because data can be stored across multiple storage systems or multiple nodes, locating a data block 212 in response to a query can present a possibility for latency or unwanted delay in storage operations. Accordingly, in one embodiment, a CRC or other like function can be run on a hash to get a hint of the hash, and the hint used to search a smaller subset of hashes with matching CRC values. FIG. 6 is a diagram illustrating an example process for locating a hash value based on a hint in accordance with one embodiment of the systems and methods described herein. Referring now to FIG. 6, at operation 411 the data blob is received for deduplication operations and a hash value for the data blob to be deduplicated is calculated. This operation can be performed in a manner the same as or similar to conventional deduplication operations in which hash values are used to manage the storage and retrieval of data blobs, an example of which is described above with reference to FIG. 1.

However, in some embodiments, the number of hash values can be sufficiently large so as to cause unwanted delay in searching hash values. For example, consider an implementation where a hash value can be 64 bytes in length. In such implementation, the number of possible hash values is $2^{}64$. It can take an undesirable amount of time to walk all $2^{}64$ hash values to look for a match. Accordingly, in one embodiment a mathematical operation such as a CRC (Cyclic Redundancy Check) can be performed on all the hashes.

A CRC or polynomial code checksum is a hash function to calculate a relatively short, fixed-length binary sequence, known as the CRC, for each block of data. For a given hash, the CRC will be the same each time it is calculated. However, because the CRC is shorter than the entire hash, there will also be false positives. That is, a group of more than one different hash values can have the same CRC code.

With continued reference to FIG. 6, at operation 415, the CRC the CRC is run on the hash value obtained in operation 411 to determine the CRC value for that hash. As stated above, for a given CRC value there can be a number of hashes that match. Accordingly, the CRC value gives the system a hint to a subset of hash values that could match the hash value obtained at operation 411. At operation 420, the system checks the CRC values already calculated and stored on the hashes for existing data blocks 212 in the system.

If there is no matching CRC value, this indicates that the hash determined at operation 411 does not exist, and thus the data block received is not currently stored in the system. Accordingly, this new data block is stored in the system and the hash table updated with its hash. This is illustrated at operations 424 and 426. As described above, various techniques can be used to determine where new data blocks will be stored in the system. These include assigning a data block to a node based on hash ranges, performing a mod operation on the hash value and using the result (i.e. remainder) to determine where to store the data block.

If, on the other hand, there CRC value for existing hashes, this is an indication that the new data blob may already be in the system. Accordingly, in such a case, the operation continues at 428 where the system determines if there is more than one hash with a matching CRC value. If there is only one hash with a matching CRC value, at operation 431 the system compares the hash value with a matching CRC to the hash value determined at operation 411 to determine whether these are the same hash value. If these are the same hash value, the hash for the data blob received at operation 411 already exists in the system. This is illustrated by operations 433 and 439. If the hash values do not match, the block received at operation 411 is a new data block that did not exist in the deduplication system. This is illustrated by operations 433 and 435.

Returning to the check at operation 428, if there is more than one hash value with the CRC that matches the CRC obtained an operation 415, the system compares these hash values to the existing hash values to see if there is an exact match. This is illustrated at operation 436. If there is not a matching hash value, the block received at operation 411 is a new data block that did not exist in the deduplication system. This is illustrated by operations 433 and 435. If there is a matching hash value, the hash for the data blob received at operation 411 already exists in the system. This is illustrated by operations 433 and 439.

As this example serves to illustrate, the use of a CRC or other mathematical operation on the hash values of the data blocks can be useful to facilitate searching of hash values, especially in environments where there are a large number of hash values.

Figure 7:
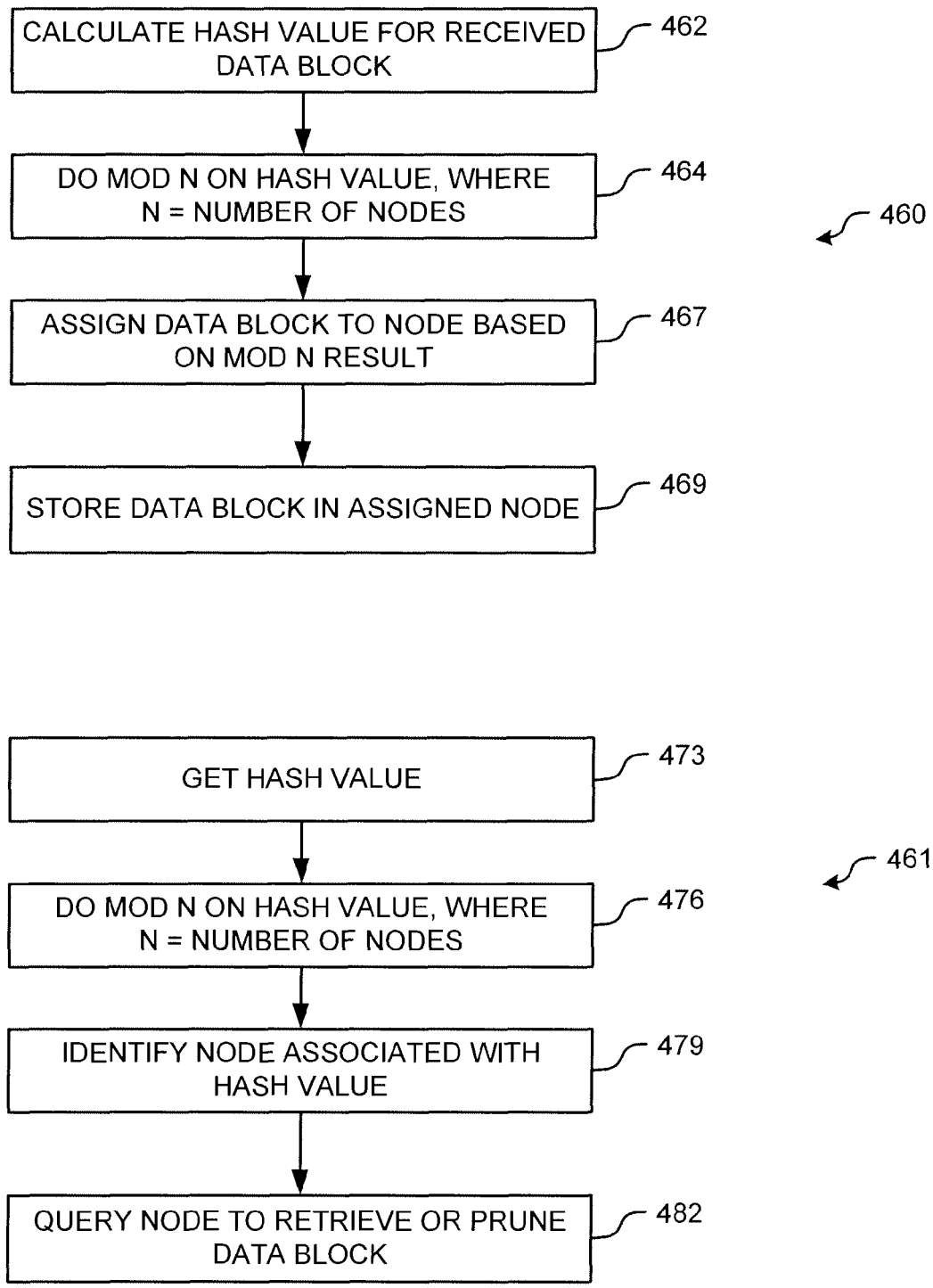
FIG. 7 is a diagram illustrating an example process utilizing a modulo arithmetic operation in accordance with one embodiment of the systems and methods described herein.

As stated above, in various embodiments a mod operation or other like operations can be performed on the hash values to determine a node 211 in which to store data. Likewise, similar operation can be used to determine a node 211 from which data should be retrieved. FIG. 7 is a diagram illustrating an example process utilizing a mod operation in accordance with one embodiment of the systems and methods described herein. Referring now to FIG. 7, process 460 is an example process for using a mod operation to store a data block 212, and process 461 is an example process for using a mod operation to retrieve a data block 212 from its node 211.

Beginning first with process 460, at operation 462 a data block or blob is received for storage in the system. A hash value for the data block is calculated. This can be performed for example in accordance with process described above with reference to FIG. 1. Next, at operation 464, a mod operation is performed on the hash value and a remainder is determined. At operation 467, blob is assigned to a deduplication node 211 based on the modulo arithmetic result. The data block can be stored in the assigned node 211 as illustrated by operation 469.

For example, a mod N operation can be performed where the hash value is divided by the number N and the remainder are determined. In one embodiment, the number N is equal to the number of nodes 211 of the system. Consider for example a three-node system. In such an example, the hash value for a given data block is divided by the number three. If the remainder it of this division is zero, the data block is stored in one node (for example node 1 211). If the remainder is one, the data block is stored in a second node (for example node 2 211); and if the remainder is two, the data block is stored in a third node (for example node 3 211).

With such a system, nodes in which blobs are stored can be identified using the same technique for data retrieval and pruning operations. Process 461 illustrates an example process for identifying a node in which a data block is stored. At operation 473, a hash value for a block to be retrieved or pruned is obtained. At operation 476 the modulo arithmetic operation is performed on the hash value. This can be performed as described above with reference to operation 464. The remainder of the modulo arithmetic operation identifies the node in which the data block associated with that hash value is stored. This is illustrated at operation 479. With the node identified, at operation 482 that node is queried to retrieve the appropriate data block for retrieval operations or to delete the appropriate data block for pruning operations. Accordingly, in various embodiments, the system is not required to go to each node to find a block of data. Instead, the system can determine with some level of confidence in which node a data block is stored. Accordingly, for data retrieval and pruning.

Using techniques such as a modulo operation to determine storage locations, all nodes can be tracked and the locations of data blocks stored in those nodes can be ascertained. Accordingly, data can be stored once and the system can be configured to keep track of the data and know in which node 211 it is stored. As described above, new nodes can be added in these techniques used to track storage locations in these new nodes. Accordingly, the system is scalable as new nodes can be added and used for deduplication storage as required.

Using techniques such as the modulo operation to determine storage locations, and the CRC operation to arrive at in utilized hints to locate hash values, storage across a large number of nodes can be performed in an efficient manner.

Figure 8:
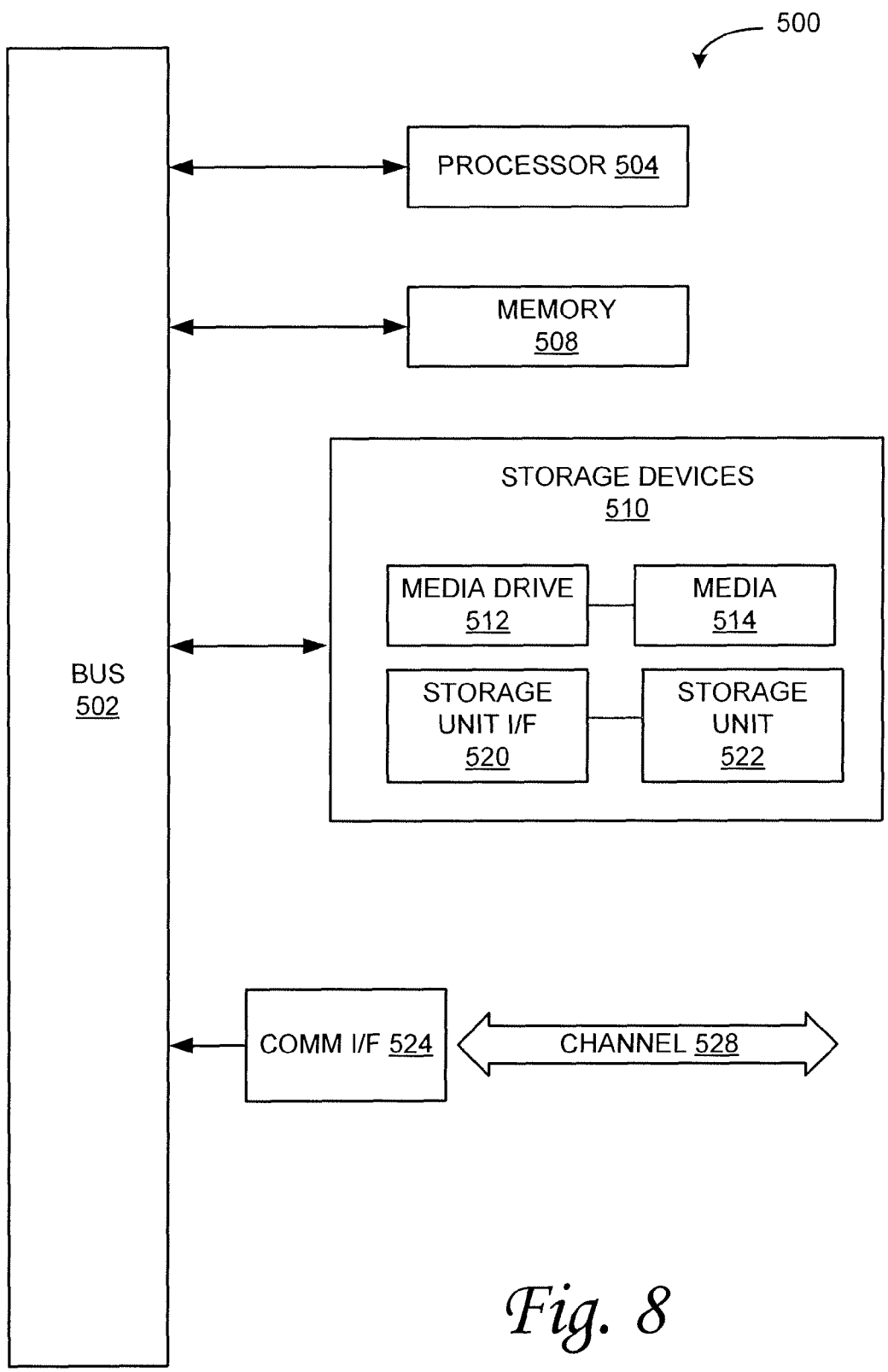
FIG. 8 is a diagram illustrating an example computing system with which aspects of the systems and methods described herein can be implemented in accordance with one embodiment of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example-computing module is shown in FIG. 8. Various embodiments are described in terms of this example-computing module 500. After reading this description, it will become apparent to a person skilled in the relevant art how to implement the invention using other computing modules or architectures.

Referring now to FIG. 8, computing module 500 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the example illustrated in FIG. 8, processor 504 is connected to a bus 502, although any communication medium can be used to facilitate interaction with other components of computing module 500 or to communicate externally.

Computing module 500 might also include one or more memory modules, simply referred to herein as main memory 508. For example, preferably random access memory (RAM) or other dynamic memory might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various four is of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514, might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. These signals can deliver the software and data from memory or other storage medium in one computing system to memory or other storage medium in computing system 500. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to physical storage media such as, for example, memory 508, storage unit 520, and media 514. These and other various forms of computer program media or computer usable media may be involved in storing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms is and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A computer-implemented method for performing data deduplication for data, the method comprising:
    deduplication control node performing data dedupiication operations at a deduplication system having one or more deduplication nodes, each deduplication node being a data deduplication node at which data deduplication is performed and each data deduplication node comprising a database in which deduplication data blocks generated by the data deduplication are stored, and wherein the dedupiication control node comprises hardware or a combination of hardware and software;
    the deduplication control node monitoring a performance characteristic of the deduplication system, wherein the performance characteristic comprises at least one of consumed capacities of the deduplication nodes. available capacities of the deduplidation node, throughput of the deduplication node, frequency of hits to the deduplication nodes, network traffic at the deduplication nodes, or speed of the deduplication nodes;
    the deduplication control node adding an additional data deduplication node to the deduplication system when the performance characteristic indicates performance of the system below a predetermined minimum; and
    the additional data deduplication node, when added to the deduplication system performs data deduplication operations, and the additional data deduplication node comprises a database in which deduplication data blocks generated by the data deduplication operations are stored.

2. The computer-implemented method of claim 1, further comprising the step of migrating one or more data blocks from the one or more deduplication nodes of the deduplication system to the additional deduplication node added to the deduplication system.

3. The computer-implemented method of claim 1, further comprising the operation of rebalancing data stored in the data deduplication system across the one or more deduplication nodes and the additional deduplication node.

4. The computer-implemented method of claim 3, wherein data blocks stored in the one or more nodes are represented by hash values stored in a deduplication database and wherein the operation of rebalancing comprises:
    performing a modulo arithmetic operation on the hash values of the data blocks stored in the one or more nodes;
    determining a remainder from the modulo arithmetic operation; and
    relocating some or all of the data blocks among at least one of the one or more deduplication nodes and the additional deduplication node using the remainder from the modulo arithmetic operation for a hash of a given data block to determine in which node to store the given data block.

5. The computer-implemented method of claim 4, wherein the modulo arithmetic operation comprises a modulo N operation, where N is the quantity of the one or more deduplication nodes and the additional deduplication node.

6. The computer-implemented method of claim 3, wherein data blocks stored in the one or more nodes are represented by hash values stored in a deduplication database and wherein the operation of rebalancing comprises:
    defining a plurality of ranges of the hash values;
    assigning each of the one or more deduplication nodes and the additional deduplication node to one of the plurality of ranges of hash values; and relocating some or all of the data blocks to a deduplication node to which their respective hash values are assigned.

7. The computer-implemented method of claim 6, further comprising:
the network control node determining a hash value for a received data block;
determining which one of the plurality of ranges the hash value determined for the received block belongs to; and
storing the received data block in a data deduplication note to which the determined range is assigned.

8. The computer-implemented method of claim 1, wherein data blocks stored in the one or more nodes are represented by hash values stored in a deduplication data base, and further comprising:
calculating hash identifiers for the hash values, wherein a hash identifier uniquely identifies a group of one or more hash values; and
associating a hash identifier with hash values in the group of hash values identified by the hash identifier.

9. The computer-implemented method of claim 8, wherein the hash identifier comprises a CRC checksum computed for one or more hash values.

10. The computer-implemented method of claim 8, further comprising:
receiving a data block for deduplication;
calculating a hash value for the data block received;
calculating a hash identifier for the hash value calculated for the received data block;
comparing the calculated hash identifier with existing hash identifiers to identify a matching hash identifier associated with one or more hash values; and
comparing the hash value with the one or more hash values associated with the identified matching hash identifier to determine whether the hash value calculated for the data block received matches a hash value already stored for a data block in the database.

11. The computer-implemented method of claim 8, wherein the groups of one or more hash values, and the hash identifiers associated with those groups, are partitioned according to one or more of the performance characteristics of the deduplication system.

12. The computer-implemented method of claim 1, wherein the performance characteristic comprises consumed capacities of nodes in the deduplication database, available capacities of nodes in the deduplication database, throughput of nodes in the deduplication database, frequency of hits to nodes in the deduplication database, performance of nodes in the deduplication database, network traffic at nodes in the deduplication database, or speed of nodes in the deduplication database.

13. The computer-implemented method of claim 1, wherein the deduplication control node comprises one of the one or more deduplication nodes.

14. A computer program product comprising a computer-readable storage medium having computer program code embodied therein for enabling a computing device to perform data deduplication for data received from a plurality of computing systems, the computer-readable program code configured to cause the computing device to perform the operations of:
performing a data deduplication operation at a deduplication system having one or more dedupiication nodes, wherein each deduplication node is a data reduplication node at which deduplication data blocks are stored and each data deduplication node comprises a database in which deduplication data blocks generated by the data deduplication are stored;
monitoring a performance characteristic of the deduplication system, wherein the performance characteristic comprises at least one of consumed capacities of the deduplication nodes, available capacities of the deduplication nodes, throughput of the deduplication nodes, frequency of hits to the deduplication nodes, network traffic at the deduplication nodes, or speed of the deduplication nodes; and
adding an additional deduplication node to the deduplication system when the performance characteristic indicates performance of the system below a predetermined minimum;
wherein the additional data deduplication node, when added to the deduplication system performs data deduplication operations, and the additional data deduplication node comprises a database in which deduplication data blocks generated by the data deduplication operations are stored.

15. The computer program product of claim 14, wherein the computer-readable program code is further configured to cause the computing device to perform the operation of migrating one or more data blocks from the one or more deduplication nodes of the deduplication system to the additional deduplication node added to the deduplication system.

16. The computer program product of claim 14, wherein the computer-readable program code is further configured to cause the computing device to perform the operation of rebalancing data stored in the data deduplication system across the one or more deduplication nodes and the additional deduplication node.

17. The computer program product of claim 16, wherein data blocks stored in the one or more nodes are represented by hash values stored in a deduplication database and wherein the operation of rebalancing comprises:
performing a modulo arithmetic operation on the hash values of the data blocks stored in the one or more nodes;
determining a remainder from the modulo arithmetic operation; and
relocating some or all of the data blocks among at least one of the one or more deduplication nodes and the additional deduplication node using the remainder from the modulo arithmetic operation for a hash of a given data block to determine in which node to store the given data block.

18. The computer program product of claim 17, wherein the modulo arithmetic operation comprises a modulo N operation, where N is the quantity of the one or more deduplication nodes and the additional deduplication node.

19. The computer program product of claim 16, wherein data blocks stored in the one or more nodes are represented by hash values stored in a deduplication database and wherein the operation of rebalancing comprises:
defining a plurality of ranges of the hash values;
assigning each of the one or more deduplication nodes and the additional deduplication node to one of the plurality of ranges of hash values; and
relocating some or all of the data blocks to a deduplication node to which their respective hash values are assigned.

20. The computer program product of claim 16, wherein the computer-readable program code is further configured to cause the computing device to perform the operations of:
determining a hash value for a received data block;
determining which one of the plurality of ranges the hash value determined for the received block belongs to; and
storing the received data block in a data deduplication node to which the determined range is assigned.

21. The computer program product of claim 14, wherein data blocks stored in the one or more nodes are represented by hash values stored in a deduplication data base, and further comprising:
calculating hash identifiers for the hash values, wherein a hash identifier uniquely identifies a group of one or more hash values; and
associating a hash identifier with hash values in the group of hash values identified by the hash identifier.

22. The computer program product of claim 21, wherein the hash identifier comprises a CRC checksum computed for one or more hash values.

23. The computer program product of claim 21, wherein the groups of one or more hash values, and the hash identifiers associated with those groups, are partitioned according to one or more of the performance characteristics of the deduplication system.

24. The computer program product of claim 14, wherein the computer-readable program code is further configured to cause the computing device to perform the operations of:
receiving a data block for deduplication;
calculating a hash value for the data block received;
calculating a hash identifier for the hash value calculated for the received data block;
comparing the calculated hash identifier with existing hash identifiers to identify a matching hash identifier associated with one or more hash values; and
comparing the hash value With the one or more hash values associated with the identified matching hash identifier to determine Whether the hash value calculate for the data block received matches a hash value already stored for data block in the database.

25. A computing system, comprising:
a plurality of data deduplication nodes capable of storing deduplication data blocks; and
a data deduplication controller communicatively coupled to the plurality of data deduplication nodes and comprising a processor and memory communicatively coupled to the processor, the memory storing instructions to cause the processor to perform the operations of:
performing data deduplication operations at a deduplication system having one or more data deduplication nodes at which deduplication data blocks are stored;
monitoring a performance characteristic of the deduplication system, wherein the performance characteristic comprises at least one of consumed capacities of the deduplication nodes available capacities of the deduplication nodes, throughput of the deduplication nodes, frequency of hits to the deduplication nodes, network traffic at the deduplication nodes, or speed of the deduplication nodes; and
adding an additional data deduplication node to the deduplication system when the performance characteristic indicates performance of the system below a predetermined minimum;
wherein the additional data deduplication node, when added to the deduplication system performs data deduplication operations, and the additional data deduplication node comprises a database in which deduplication data blocks generated by the data deduplication operations are stored.

26. The computing system of claim 25, wherein the deduplication control node controller comprises one of the plurality of data storage devices or is distributed across a plurality of data storage devices.

27. The computing system of claim 25 wherein the instructions further cause the computing device to perform the operation of migrating one or more data blocks from the one or more data storage devices of the deduplication system to the additional data storage device added to the deduplication system.

28. The computing system of claim 25, wherein the instructions further cause the computing device to perform the operation of rebalancing data stored in the data deduplication system across the one or more data storage devices and the additional data storage device.

29. The computing system of claim 28, wherein data blocks stored in the one or more data storage devices are represented by hash values stored in a deduplication database and wherein the operation of rebalancing comprises:
performing a modulo arithmetic operation on the hash values of the data blocks stored in the one or more data storage devices;
determining a remainder from the modulo arithmetic operation; and
relocating some or all of the data blocks among at least one of the one or more data storage devices and the additional data storage device using the remainder from the modulo arithmetic operation for a hash of a given data block to determine in which node to store the given data block.

30. The computing system of claim 29, wherein the modulo arithmetic operation comprises a modulo N operation, where N is the quantity of the one or more data storage devices and the additional data storage device.

31. The computing system of claim 28, wherein data blocks stored in the one or more data storage devices are represented by hash values stored in a deduplication database and wherein the operation of rebalancing comprises:
defining a plurality of ranges of the hash values;
assigning each of the one or more data storage devices and the additional data storage device to one of the plurality of ranges of hash values; and
relocating some or all of the data blocks to at least one of the data storage devices to which their respective hash values are assigned.

32. The computing system of claim 31, wherein the instructions further cause the computing device to perform the operations of:
determining a hash value for a received data block;
determining which one of the plurality of ranges the hash value determined for the received block belongs to; and
storing the received data block in a data storage device to which the determined range is assigned.

33. The computing system of claim 25, wherein data blocks stored in the one or more data storage devices are represented by hash values stored in a deduplication data base, and further comprising:
calculating hash identifiers for the hash values, wherein a hash identifier uniquely identifies a group of one or more hash values; and
associating a hash identifier with hash values in the group of hash values identified by the hash identifier.

34. The computing system of claim 33, wherein the hash identifier comprises a CRC checksum computed for one or more hash values.

35. The computing system of claim 33, wherein the instructions further cause the computing device to perform the operations of:
receiving a data block for deduplication;
calculating a hash value for the data block received;
calculating a hash identifier for the hash value calculated for the received data block;

comparing the calculated hash identifier with existing hash identifiers to identify a matching hash identifier associated with one or more hash values; and comparing the hash value with the one or more hash values associated with the identified matching hash identifier to determine whether the hash value calculated for the data block received matches a hash value already stored for a data block in the database.

36. The computing system of claim 33, wherein the groups of one or more hash values, and the hash identifiers associated with those groups, are partitioned according to one or more of the performance characteristics of the deduplication system.

* * * * *

UNITED STATES PATENT AND TRADEMARK OFFICE
CERTIFICATE OF CORRECTION

| | | |
|---|---|---|
| PATENT NO. | : 8,732,133 B2 | Page 1 of 1 |
| APPLICATION NO. | : 12/725288 | |
| DATED | : May 20, 2014 | |
| INVENTOR(S) | : Deepak Attarde et al. | |

It is certified that error appears in the above-identified patent and that said Letters Patent is hereby corrected as shown below:

In the Specification

In column 2 at line 3, Change "severly" to --severely--.

In column 2 at line 60, Change "the the" to --the--.

In column 5 at line 57, Change "is of" to --of--.

In column 6 at line 34, Change "Fore" to --For--.

In column 17 at line 64, Change "four is" to --form--.

In column 19 at line 30, Change "Terms is" to --Terms--.

In the Claims

In column 20 at line 5, In Claim 1, after "data" insert --a--.

In column 20 at line 6, In Claim 1, change "dedupiication" to --deduplication--.

In column 20 at line 13, In Claim 1, change "dedupiication" to --deduplication--.

In column 20 at line 18, In Claim 1, change "nodes." to --node--.

In column 20 at line 19, In Claim 1, change "deduplidation" to --deduplication--.

In column 21 at line 23, In Claim 10, change "claim 8." to --claim 8,--.

In column 21 at line 28, In Claim 10, change "block:" to --block;--.

In column 21 at line 62, In Claim 14, change "dedupiication" to --deduplication--.

In column 21 at line 63, In Claim 14, change "reduplication" to --deduplication--.

In column 23 at line 28, In Claim 24, change "With" to --with--.

In column 23 at line 30, In Claim 24, change "Whether" to --whether--.

In column 23 at line 30, In Claim 24, change "calculate" to --calculated--.

In column 23 at line 31, In Claim 24, after "for" insert --a--.

In column 23 at line 47, In Claim 25, change "nodes" to --nodes,--.

Signed and Sealed this
Tenth Day of May, 2016

Michelle K. Lee
*Director of the United States Patent and Trademark Office*